US009738952B2

United States Patent
Kikugawa et al.

(10) Patent No.: US 9,738,952 B2
(45) Date of Patent: Aug. 22, 2017

(54) HYDROGEN STORING ALLOY

(71) Applicant: Mitsui Mining & Smelting Co., Ltd., Tokyo (JP)

(72) Inventors: Shingo Kikugawa, Takehara (JP); Keisuke Miyanohara, Takehara (JP); Yoshimi Hata, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 15/100,351

(22) PCT Filed: Mar. 25, 2015

(86) PCT No.: PCT/JP2015/059100
§ 371 (c)(1),
(2) Date: May 31, 2016

(87) PCT Pub. No.: WO2015/147044
PCT Pub. Date: Oct. 1, 2015

(65) Prior Publication Data
US 2016/0298214 A1    Oct. 13, 2016

(30) Foreign Application Priority Data

Mar. 26, 2014   (JP) .................................. 2014-064159
Dec. 8, 2014    (WO) .................. PCT/JP2014/082370

(51) Int. Cl.
| | | |
|---|---|---|
| H01M 4/04 | (2006.01) | |
| H01M 4/38 | (2006.01) | |
| C22C 19/00 | (2006.01) | |
| C22C 19/03 | (2006.01) | |
| C22F 1/10 | (2006.01) | |
| B22D 7/00 | (2006.01) | |
| B22D 21/00 | (2006.01) | |
| C22C 1/02 | (2006.01) | |
| H01M 10/04 | (2006.01) | |
| H01M 10/34 | (2006.01) | |
| B22F 1/00 | (2006.01) | |
| C22F 1/00 | (2006.01) | |
| H01M 4/02 | (2006.01) | |

(52) U.S. Cl.
CPC ............ *C22C 19/007* (2013.01); *B22D 7/005* (2013.01); *B22D 21/005* (2013.01); *C22C 1/02* (2013.01); *C22C 19/00* (2013.01); *C22C 19/03* (2013.01); *C22F 1/10* (2013.01); *H01M 4/0471* (2013.01); *H01M 4/0485* (2013.01); *H01M 4/0488* (2013.01); *H01M 4/385* (2013.01); *H01M 10/0413* (2013.01); *H01M 10/345* (2013.01); *B22F 1/00* (2013.01); *C22F 1/00* (2013.01); *H01M 2004/027* (2013.01); *H01M 2220/20* (2013.01)

(58) Field of Classification Search
CPC .......... H01M 4/04; H01M 4/24; H01M 4/383; H01M 4/242; H01M 4/38
See application file for complete search history.

(56) References Cited

U.S. PATENT DOCUMENTS

| | | | |
|---|---|---|---|
| 6,207,323 B1 | 3/2001 | Yamaguchi et al. | |
| 6,444,361 B1* | 9/2002 | Komori | H01M 4/383 |
| | | | 429/209 |
| 2003/0129459 A1* | 7/2003 | Ovshinsky | B60L 11/1898 |
| | | | 429/9 |
| 2006/0166099 A1* | 7/2006 | Okabe | H01M 4/242 |
| | | | 429/232 |
| 2008/0160408 A1 | 7/2008 | Ito et al. | |
| 2010/0221608 A1* | 9/2010 | Ohyama | B22F 1/0018 |
| | | | 429/218.2 |

FOREIGN PATENT DOCUMENTS

| | | |
|---|---|---|
| CN | 102576919 B | 7/2014 |
| JP | 963581 A | 3/1997 |
| JP | 11260361 A | 9/1999 |
| JP | 2002256301 A | 9/2002 |
| JP | 2004285406 A | 10/2004 |
| JP | 2008166027 A | 7/2008 |
| JP | 2010255104 A | 11/2010 |
| JP | 2011231362 A | 11/2011 |
| JP | 2012102343 A | 5/2012 |
| WO | 2006085542 A1 | 8/2006 |
| WO | 2007040277 A1 | 4/2007 |
| WO | 2008123616 A1 | 10/2008 |

* cited by examiner

*Primary Examiner* — Kenneth Douyette
(74) *Attorney, Agent, or Firm* — The Webb Law Firm

(57) ABSTRACT

A hydrogen storing alloy containing only a few impurities leading to a short circuit where the yield can be maintained even when the alloy is subjected to magnetic separation treatment. A hydrogen storing alloy includes a matrix phase having an AB5 type crystal structure, the alloy having a misch metal (referred to as "Mm") in an A-site in an ABx composition and having any one or at least one of Ni, Al, Mn, and Co in a B-site in the ABx composition, wherein the ratio (referred to as "ABx") of the total number of moles of elements comprising the B site to the total number of moles of elements comprising the A site is $5.00 < ABx \leq 5.40$; the content of Co is more than 0.0 mol % and less than 0.7 mol %; and residual magnetization is more than 0 emu/g and 0.020 emu/g or less.

10 Claims, No Drawings

HYDROGEN STORING ALLOY

CROSS-REFERENCE TO RELATED APPLICATION

This application is the United States national phase of International Application No. PCT/JP2015/059100 filed Mar. 25, 2015, and claims priority to Japanese Patent Application No. 2014-064159 and International Application No. PCT/JP2014/082370 filed Mar. 26, 2014 and Dec. 8, 2014 respectively, the disclosures of which are hereby incorporated in their entirety by reference.

TECHNICAL FIELD

The present invention relates to an $AB_5$ type hydrogen storing alloy having a $CaCu_5$ type crystal structure. Specifically, the present invention relates to a hydrogen storing alloy suitable as a negative electrode active material used for a nickel-hydrogen battery mounted on an electric vehicle, a hybrid electric vehicle, and the like.

BACKGROUND ART

A hydrogen storing alloy is an alloy that reacts with hydrogen to form a metal hydride, and since the alloy can reversibly store and release a large amount of hydrogen in the vicinity of room temperature, practical utilization thereof as a battery material has been advanced in various fields, such as: a nickel-hydrogen battery (also referred to as a "Ni-MH battery") mounted on an electric vehicle (EV), a hybrid electric vehicle (HEV: a motor vehicle using two power sources of an electric motor and an internal combustion engine in combination), and a digital still camera; and a fuel cell.

Various alloys, such as an $AB_5$ type alloy typified by $LaNi_5$, an $AB_2$ type alloy typified by $ZrV_{0.4}Ni_{1.5}$, an AB type alloy, and an $A_2B$ type alloy, are known as a hydrogen storing alloy. Many of these alloys are composed of a combination of an element group that has high affinity with hydrogen and plays a role of increasing hydrogen storage capacity (such as Ca, Mg, rare earth elements, Ti, Zr, V, Nb, Pt, and Pd) and an element group that has a relatively low affinity with hydrogen and a small hydrogen storage capacity but plays a role of promoting hydrogenation reaction and reducing the reaction temperature (such as Ni, Mn, Cr, and Fe).

Among them, an $AB_5$ type hydrogen storing alloy having a $CaCu_5$ type crystal structure, for example, an alloy using Mm (misch metal) which is a rare earth mixture in the A site and elements such as Ni, Al, Mn and Co in the B site (hereinafter, this type of alloy is referred to as a "Mm-Ni—Mn—Al—Co alloy") has features that a negative electrode can be composed of relatively inexpensive materials compared with other alloy compositions, and that a closed-type nickel-hydrogen battery with long cycle life and little internal pressure increase due to gases generated during overcharging can be composed.

With respect to this type of $AB_5$ type hydrogen storing alloy, for example, Patent Literature 1 (WO 2006/085542) discloses a low Co hydrogen storing alloy having a $CaCu_5$ type crystal structure that can be represented by the general formula MmNiaMnbAlcCod (wherein Mm represents a misch metal, $4.0 \leq a \leq 4.7$, $0.30 \leq b \leq 0.65$, $0.20 \leq c \leq 0.50$, $0 < d \leq 0.35$, and $5.2 \leq a+b+c+d \leq 5.5$), wherein the $CaCu_5$ type crystal structure has a crystal lattice having an a-axis length of 499.0 pm or more and a c-axis length of 405.0 pm or more; and in a pressure-composition isothermal chart (PCT curve) at 45° C., equilibrium hydrogen pressure at a hydrogen storage capacity (H/M) of 0.5 is 0.06 MPa or less.

Patent Literature 2 (WO 2007/040277) discloses a hydrogen storing alloy having a $CaCu_5$ type crystal structure that can be represented by the general formula MmNiaMnbAlcCodFee (wherein Mm represents a misch metal including La, $0.2 \leq d \leq 0.5$, $5.025 \leq a+b+c+d+e \leq 5.200$), wherein the content of La in the hydrogen storing alloy is 13 to 27 wt %; and the $CaCu_5$ type crystal structure has a lattice volume of $88.70 \times 10^6$ (pm$^3$) or less and a full width at half maximum at the (002) plane of 0.29(°) or less, these values being obtained by subjecting the alloy to X-ray diffraction measurement and elaboration of a lattice constant.

Patent Literature 3 (WO 2008/123616) discloses a hydrogen storing alloy comprising a matrix phase having a $CaCu_5$ type crystal structure, wherein when the alloy is subjected to point analysis with an energy dispersive X-ray analyzer (EDX), the Fe peak intensity ratio which is the ratio of the Fe peak intensity of a segregation phase to the Fe peak intensity of a matrix phase [[(Fe peak intensity of a segregation phase)/(Fe peak intensity of a matrix phase)]×100 (%)] is 103(%)<Fe peak intensity ratio<245(%).

Further, Patent Literature 4 (Japanese Patent Laid-Open No. 2011-231362) discloses an Al-containing hydrogen storing alloy of a $CaCu_5$ type crystal structure having a space group of International Table Number 191 (P6/mmm), wherein in the crystal structure analysis of the hydrogen storing alloy, a Beq ratio (2c/3g) as a ratio of a thermal vibration parameter Beq (2c) at a 2c site to a thermal vibration parameter Beq (3g) at a 3g site is 1.4 to 10.0.

When it is taken into consideration that a hydrogen storing alloy is used for a Ni-MH battery to be mounted on an electric vehicle, a hybrid electric vehicle, and the like, it is necessary to further improve the charge-discharge cycle ability and the output characteristics of the battery.

Particularly, in the Ni-MH battery using a hydrogen storing alloy as a negative electrode active material, the corrosion of the hydrogen storing alloy gradually proceeds by a strongly alkaline electrolyte solution. Therefore, it is necessary to improve the corrosion resistance of the alloy for achieving the longer life-span of the battery. The corrosion of the alloy proceeds for the following reasons: That is, a hydrogen storing alloy having a surface state that is rich in nickel has high initial degree of activity. However, manganese, aluminum, and the like in the hydrogen storing alloy are oxidized by oxygen generated from the positive electrode and an alkali electrolyte solution to form a hydroxide, and the hydroxide produces a film poor in conductivity on the alloy surface to reduce the negative electrode conductivity. Thus, the corrosion of the hydrogen storing alloy proceeds by the electrolyte solution.

Therefore, as a method for improving the corrosion resistance of a hydrogen storing alloy, for example, Patent Literature 5 (Japanese Patent Laid-Open No. 9-63581) proposes a method including bringing a hydrogen storing alloy electrode into contact with an alkaline aqueous solution to increase the specific surface area of the hydrogen storing alloy powder and then bringing the resulting hydrogen storing alloy electrode into contact with an acidic aqueous solution having a pH of 3 to 6 which contains fluorine ions to fluorinate the surface of the hydrogen storing alloy powder having the increased specific surface area.

On the other hand, since the output characteristics of a Ni-MH battery is mainly influenced by the discharge characteristics of a metal hydride electrode, in order to improve the high rate discharge characteristics of the metal hydride electrode, there is proposed a method of previously immersing a hydrogen storing alloy powder in a high-temperature aqueous alkali solution to thereby activate the hydrogen storing alloy powder. For example, there is disclosed a method of surface-treating a hydrogen storing alloy powder with a weakly acidic aqueous solution having a pH value of 0.5 to 5 (for example, refer to Patent Literature 6 (Japanese Patent Laid-Open No. 11-260361)).

Further, in order to increase the initial activity of a hydrogen storing alloy, the hydrogen storing alloy is subjected to surface activation treatment with an alkali aqueous solution or the like to form a nickel-condensed layer acting as a hydrogen catalyst layer in the vicinity of the surface of the hydrogen storing alloy to facilitate the hydrogen storage and release of the hydrogen storing alloy. For example, Patent Literature 7 (Japanese Patent Laid-Open No. 2002-256301) discloses a hydrogen storing alloy in which a nickel-condensed layer is formed in the vicinity of the surface of the hydrogen storing alloy, and the Ni magnetic susceptibility is 3 to 9 as a quantitative definition of the nickel-condensed layer.

As described above, a hydrogen storing alloy powder has been immersed in an alkali solution to perform alkali treatment for the purpose of increasing both the charge-discharge cycle ability and the output characteristics of a battery. When the hydrogen storing alloy powder is subjected to alkali treatment, alloy components, particularly Mn, Al, and Mm (La, Ce, Nd, Pr), are eluted from the alloy surface into the alkali solution, and components essentially comprising Ni, Co and Fe which are the remaining alloy components form the surface layer of the hydrogen storing alloy. Therefore, Ni, Co, and Fe which are ferromagnetic substances will be present on the surface of the hydrogen storing alloy, and the residual magnetization tends to be high. That is, in the conventional research and development of the hydrogen storing alloy, the research and development have generally been conducted in the direction of increasing the residual magnetization of the hydrogen storing alloy.

[Patent Literature 1]
 International Publication No. WO 2006/085542
[Patent Literature 2]
 International Publication No. WO 2007/040277
[Patent Literature 3]
 International Publication No. WO 2008/123616
[Patent Literature 4]
 Japanese Patent Laid-Open No. 2011-231362
[Patent Literature 5]
 Japanese Patent Laid-Open No. 9-63581
[Patent Literature 6]
 Japanese Patent Laid-Open No. 11-260361
[Patent Literature 7]
 Japanese Patent Laid-Open No. 2002-256301
[Patent Literature 8]
 Japanese Patent Laid-Open No. 2010-255104

SUMMARY OF INVENTION

Incidentally, if a hydrogen storing alloy powder contains impurities which do not form an alloy, the impurities may not only reduce hydrogen storage capacity but also, for example, may be eluted into an electrolyte solution (alkaline solution) and pass through a separator, leading to a short circuit (voltage drop) when charge and discharge are repeated under severe conditions such as over discharge even if there will be no problem when charge and discharge are repeated under common conditions.

Therefore, for example, Patent Literature 8 (Japanese Patent Laid-Open No. 2010-255104) and the like propose a method of removing impurities leading to a short circuit by melting a hydrogen storing alloy raw material to form a molten metal, cooling the molten metal to obtain a hydrogen storing alloy ingot, grinding the ingot, and finally subjecting the resulting hydrogen storing alloy powder to magnetic separation treatment of eliminating a magnetic substance from the hydrogen storing alloy powder using a magnet.

However, there has been a problem that when the hydrogen storing alloy powder is subjected to magnetic separation treatment of eliminating a magnetic substance from the hydrogen storing alloy powder using a magnet in this way, the impurities leading to a short circuit can be removed, but the alloy itself may be magnetically attracted to reduce the yield, thus increasing the production cost.

Therefore, the present invention is intended to provide a new hydrogen storing alloy in which only a few impurities leading to a short circuit are contained, and the yield can be maintained at a good level even when the alloy is subjected to magnetic separation treatment.

The present invention proposes a hydrogen storing alloy comprising a matrix phase of a $CaCu_5$ type, that is, an $AB_5$ type crystal structure, a misch metal (referred to as "Mm") comprising an A-site in ABx composition and any one or a combination of two or more of Ni, Al, Mn, and Co comprising a B-site in the ABx composition, wherein the ratio (referred to as "ABx") of the total number of moles of elements comprising the B site to the total number of moles of elements comprising the A site is 5.00<ABx≤5.40; the ratio of the number of moles of Co to the total number of moles of elements comprising the A site is more than 0.0 and less than 0.7; and residual magnetization is more than 0 (emu/g) and 0.020 (emu/g) or less.

The hydrogen storing alloy proposed by the present invention can provide a good yield even when the alloy is subjected to magnetic separation treatment in order to reduce the amount of impurities leading to a short circuit by controlling residual magnetization in the range of more than 0 (emu/g) and 0.020 (emu/g) or less in a predetermined composition, that is, in a composition in which ABx and the content of Co are in a predetermined range. Further, the hydrogen storing alloy proposed by the present invention can have a high pulverization residual ratio by reducing residual magnetization without subjecting the alloy to magnetic separation treatment. That is, when the alloy is used as a negative electrode active material of a nickel-hydrogen battery, charge-discharge cycle ability can be improved.

DESCRIPTION OF THE INVENTION

The embodiment of the present invention will be described in detail below. However, the scope of the present invention is not limited to the embodiment to be described below.

<The Present Hydrogen Storing Alloy>

The hydrogen storing alloy of the present embodiment (hereinafter referred to as "the present hydrogen storing alloy") is a hydrogen storing alloy comprising a matrix phase having a $CaCu_5$ type crystal structure having a space group of International Table Number 191 (P6/mmm), that is, an AB5-type crystal structure.

(Composition)

The present hydrogen storing alloy is an alloy containing a misch metal (referred to as "Mm") in an A site in ABx composition and containing any one or a combination of two or more of Ni, Al, Mn, and Co in a B site in the ABx composition.

Examples thereof include an $AB_5$ type hydrogen storing alloy that can be represented by the general formula: $MmNi_aMn_bAl_cCo_d$ (wherein Mm represents a misch metal) and an $AB_5$ type hydrogen storing alloy that can be represented by the general formula: $MmNi_aMn_bAl_cCo_dM_e$ (wherein Mm represents a misch metal, and M represents one or two or more transition metals excluding Ni, Mn, Al, and Co).

In the present hydrogen storing alloy, the ratio (referred to as "ABx") of the total number of moles of elements (that is, "a+b+c+d" or "a+b+c+d+e" in the above formulas) comprising the B site in the ABx composition to the total number of moles of elements comprising the A site in the ABx composition is not particularly limited.

For example, from the point of view of using the alloy for the negative electrode active material of a Ni-MH battery to be mounted on an electric vehicle (referred to as "EV") and a hybrid electric vehicle (referred to as "HEV"), the ratio is preferably 5.00<ABx≤5.40. When ABx is 5.00 or more, reduction in low-temperature volume and charge-discharge cycle ability (capacity retention rate) can be suppressed. Therefore, from such a point of view, ABx is more preferably 5.10 or more, further preferably 5.20 or more, most preferably 5.30 or more; on the other hand, from the point of view of reducing residual magnetization, ABx is more preferably 5.35 or less.

With respect to Co, from the point of view of cost, charge-discharge cycle ability, and reduction in residual magnetization, the ratio of the number of moles of Co to the total number of moles of Mm comprising the A site, that is, the molar ratio (d) of Co in the above general formulas, is preferably more than 0.0 and 0.7 or less. The ratio is more preferably more than 0.0 and 0.5 or less, further preferably more than 0.03 and 0.4 or less, most preferably more than 0.03 and 0.3 or less.

The composition ratio of Mm, Ni, Mn, Al, and M is not particularly limited from the point of view of solving the problems of the present invention. However, from the point of view of using the alloy for the negative electrode active material of a Ni-MH battery to be mounted on EV and HEV, the ratio can be considered as follows.

With respect to Ni, from the point of view of maintaining pulverization characteristics and charge-discharge cycle ability while maintaining output characteristics, the ratio of the number of moles of Ni to the total number of moles of Mm comprising the A site, that is, the molar ratio (a) of Ni in the above general formulas, is preferably 3.8 or more and 4.7 or less, more preferably 4.0 or more and 4.6 or less, further preferably 4.1 or more and 4.5 or less, most preferably 4.15 or more and 4.4 or less.

With respect to Mn, from the point of view of easily maintaining the pulverization residual ratio, the molar ratio (b) of Mn in the above general formulas is preferably 0.1 or more and 0.6 or less, more preferably 0.2 or more and 0.5 or less, most preferably 0.3 or more and 0.45 or less.

With respect to Al, from the point of view of capable of suppressing the deterioration of the energy efficiency of charge and discharge due to excessively high Plateau pressure and capable of suppressing the reduction in hydrogen storage capacity, the molar ratio (c) of Al in the above general formulas is preferably 0.1 or more and 0.6 or less, more preferably 0.15 or more and 0.45 or less, further preferably 0.2 or more and 0.4 or less, most preferably 0.25 or more and 0.35 or less.

The M element in the general formula: $MmNi_aMn_bAl_cCo_dM_e$ (wherein Mm is a misch metal) may be, for example, one or two or more transition metals excluding Ni, Mn, Al, and Co. Examples thereof include Fe, Cu, V, Zn, and Zr. From the point of view of charge-discharge cycle ability, preferred examples include one or two of Fe and Cu, and more preferred examples include Fe. For example, pulverization can be suppressed, that is, charge-discharge cycle ability can be increased, by adding adequate amount of Fe. However, the M element in the above composition formula is not an essential element.

The molar ratio (e) of the M element in the above general formulas is preferably adjusted within the range of 0≤e≤0.20, more preferably 0.10 or less, most preferably 0.05 or less.

Mm may be a mixture (misch metal) of rare earth elements including at least La and Ce. Mm generally includes rare earth elements such as Pr, Nd, and Sm in addition to La and Ce. Examples thereof include a rare earth mixture comprising Ce (3 wt % to 10 wt %), La (15 wt % to 40 wt %), Pr, and Nd as main constituent elements. Particularly in the present hydrogen storing alloy, the content of La is preferably 13 wt % to 30 wt %, more preferably 18 wt % to 28 wt %, most preferably 20 wt % to 27 wt %, in the hydrogen storing alloy; and the content of Ce is preferably 3 wt % to 10 wt %, more preferably 4 wt % to 9 wt %, most preferably 4.5 wt % to 8.5 wt %, in the hydrogen storing alloy.

Note that the present hydrogen storing alloy may contain any impurity selected from the group consisting of Ti, Mo, W, Ca, Pb, Cd, and Mg as long as the content is about 0.05% by mass or less.

(Residual Magnetization)

It is important that the present hydrogen storing alloy has a residual magnetization of more than 0 (emu/g) and 0.020 (emu/g) or less.

When the residual magnetization is more than 0 (emu/g) and 0.020 (emu/g) or less, the yield can be increased even when the alloy is subjected to magnetic separation treatment. Further, also when the alloy is not subjected to magnetic separation treatment, the pulverization residual ratio can be increased by having reduced the residual magnetization.

From such a point of view, it is important that the residual magnetization of the present hydrogen storing alloy is preferably more than 0 (emu/g) and 0.020 (emu/g) or less, more preferably 0.015 (emu/g) or less, most preferably 0.010 (emu/g) or less.

In order to adjust the residual magnetization of the present hydrogen storing alloy to the above range, it is preferred to adjust heat treatment conditions. For example, with respect to the temperature control of heat treatment, it is preferred that the alloy be subjected to heat treatment maintaining a predetermined temperature, cooled, and then subjected to a second heat treatment so that a predetermined temperature is maintained. It is also preferred that the alloy be subjected to pulse-controlled temperature control of repeating temperature control cycles at a predetermined interval in which a predetermined temperature (heat treatment temperature) is maintained; the temperature is once increased from the central temperature and returned to the central temperature in a short time; and then the temperature is once decreased from the central temperature and returned to the central temperature in a short time. However, the temperature control is not limited to such a method.

<Method for Producing the Present Hydrogen Storing Alloy>

The present hydrogen storing alloy can be obtained, for example, by weighing and mixing each hydrogen storing alloy raw material so that a predetermined alloy composition may be obtained, melting the hydrogen storing alloy raw materials, for example, using a high-frequency heating melting furnace by induction heating to form a molten metal, pouring the molten metal into a mold, for example, a water-cooled type mold, casting the molten metal at a cast molten metal temperature of, for example, 1350 to 1550° C., subjecting the cast metal to a predetermined heat treatment, and then grinding the heat-treated cast metal.

However, a method for producing the present hydrogen storing alloy is not limited to such a production method.

The atmosphere during the heat treatment is preferably inert gas, such as Ar and $N_2$.

The temperature during heat treatment is controlled as follows: A temperature of 900 to 1100° C. (referred to as "heat treatment temperature") is maintained for 1 to 10 hours to perform heat treatment; next, the alloy is cooled to 500° C. at a cooling rate of 10 to 30° C./min and then naturally cooled to 100° C. or less. Then, the heat treatment and cooling under the same conditions as described above are preferably performed twice or three times or more.

In the above heat treatment, one heat-treatment time is preferably 1 hour or more and 10 hours or less, more preferably 2 hours or more and 8 hours or less, most preferably 2 hours or more and 5 hours or less.

Further, the alloy may be subjected to pulse control of repeating temperature control cycles at a predetermined interval as needed in which the alloy is heated to a temperature of 900 to 1100° C. (referred to as "heat treatment central temperature"); the temperature is increased from the central temperature and returned to the central temperature in a short time; and then the temperature is decreased from the central temperature and returned to the central temperature in a short time.

In such pulse control, the alloy is preferably heated or cooled by 2° C. to 10° C., more preferably 2° C. to 8° C., most preferably 2° C. to 5° C., from the heat treatment central temperature.

Further, in the above pulse control, the heating rate and the cooling rate are preferably 0.1 to 1.0° C./min, more preferably 0.1 to 0.8° C./min, most preferably 0.2° C./min or more and 0.5° C./min or less.

The heat treatment time in the above pulse control, that is, the total heat treatment time, is preferably 1 hour to 10 hours, more preferably 2 hours or more and 8 hours or less, most preferably 2 hours or more and 5 hours or less.

Then, after the heat treatment by such pulse control, the alloy is cooled to 500° C. at a cooling rate of 10 to 30° C./min and then naturally cooled to 100° C. or less.

The resulting hydrogen storing alloy ingot is preferably ground, for example, to a particle size that passes through a 500 μm mesh sieve (−500 μm). However, the degree of coarse grinding may be grinding to a particle size that passes through a 1000 μm mesh sieve (−1000 μm) or may be grinding to a particle size that passes through an 850 μm mesh sieve (−850 μm), as needed.

Note that since magnetic separation efficiency will be reduced if the ingot is excessively finely ground in this stage, the ingot may be pulverized to some extent, but is preferably coarsely ground so that a coarse powder that is larger than 150 μm may be contained in an amount of 50% by mass or more.

The coarse grinding of the hydrogen storing alloy ingot can be performed using a cracking apparatus or a grinding apparatus in which a grinding portion in contact with a powder, that is, a grinding means, is made of iron or an iron alloy. Examples of such a cracking apparatus or a grinding apparatus include a roll crusher, a double roll crusher, and a jaw crusher.

When the coarse grinding is performed in an apparatus provided with a grinding means containing iron or an iron alloy, the iron or iron alloy will be mixed with the coarsely ground powder, but since at least a magnetic substance that influences a short circuit can be removed in the next magnetic separation step, the coarse grinding can be performed in such a grinding apparatus. However, here, it is not meant that it is preferred to coarsely grind the ingot in an apparatus provided with a grinding means containing iron or an iron alloy, but it is meant that the effect of the present invention is more enjoyable.

The coarse grinding of the hydrogen storing alloy ingot may be performed by a dry process or may be performed by a wet process.

<Utilization of the Present Hydrogen Storing Alloy>

The present hydrogen storing alloy (including ingot and powder) can be subjected to magnetic separation treatment as needed and then utilized as a negative electrode material for batteries. That is, if a large number of impurities are contained in the present hydrogen storing alloy, the impurities may not only reduce hydrogen storage capacity but also may be eluted into an electrolyte solution (alkaline solution) and pass through a separator, leading to a short circuit (voltage drop) when charge and discharge are repeated under severe conditions such as over discharge. Therefore, it is preferred to perform the following magnetic separation treatment as needed to remove the impurities leading to a short circuit. One of the features of the present hydrogen storing alloy is in that the yield can be maintained at a good level even when magnetic separation treatment is performed.

However, the present hydrogen storing alloy can also be utilized as a negative electrode material for batteries without performing magnetic separation treatment. In this case, one of the features of the present hydrogen storing alloy is in that the pulverization residual ratio can be satisfactorily increased without performing magnetic separation treatment since residual magnetization is low.

When the present hydrogen storing alloy (including ingot and powder) is utilized as a negative electrode material for batteries, the negative electrode for batteries can be prepared, for example, by a known method after the alloy is subjected to magnetic separation treatment as needed as described above. That is, a hydrogen storing alloy negative electrode can be formed by mixing a binder, a conductive aid, and the like with the present hydrogen storing alloy and shaping the mixture, by a known method.

(Magnetic Separation Treatment)

The magnetic separation treatment immediately after grinding is not preferred because a magnetic substance is prone to adhere to a magnet due to stress. Therefore, the alloy is preferably charged to a magnetic separation apparatus at an elapsed time of 20 seconds or more, more preferably 30 seconds or more, most preferably 40 seconds or more, after grinding.

However, the alloy is preferably charged to a magnetic separation apparatus at an elapsed time of 48 hours or less, more preferably 24 hours or less, most preferably 12 hours or less, after grinding, because the alloy may change in quality if it is allowed to stand for an excessively long time after grinding.

In the magnetic separation treatment, a magnet is used to allow a magnetic substance to adhere to the magnet; and the adhered magnetic substance is removed, that is, a non-magnetic substance is recovered so as to obtain a hydrogen storing alloy powder.

Note that the magnetic separation may be performed by a dry process or a wet process.

The magnet used for the magnetic separation treatment preferably has a magnetic force of 100 mT±10% to 700 mT±10%, more preferably 150 mT±10% or more and 650 mT±10% or less, further preferably 200 mT±10% or more and 600 mT±10% or less, most preferably 250 mT±10% or more and 600 mT±10% or less.

Note that even when a magnet has a magnetic force of 100 mT, the magnetic force is shown as "100 mT±10%" because it changes with environment by about 20%.

The magnet to be used may be a permanent magnet or an electromagnet. Further, the shape, size, and surface area of a magnet, the distance between magnets, and the like can be suitably selected, and an optimum may be selected.

As a standard, the surface area of a magnet (the total surface area when a plurality of magnets are used) is preferably 50 cm$^2$ to 3000 cm$^2$, more preferably 50 cm$^2$ to 2000 cm$^2$.

Further, the size of a magnet is preferably determined by the viscosity or the like of a powder to be subjected to magnetic separation. As a standard, a magnet having a diameter of 1 mm to 100 mm is preferred; a magnet having a diameter of 10 mm to 80 mm is more preferred; and a magnet having a diameter of 20 mm to 50 mm is most preferred.

The rate of charging a hydrogen storing alloy to a magnetic separation apparatus is preferably 150 g/min to 15000 g/min, more preferably 200 g/min to 10000 g/min, most preferably 200 g/min to 8500 g/min.

Further, the charge rate relative to the surface area of a magnet (the total surface area when a plurality of magnets are used) is preferably adjusted so as to be 300 ((g/min)/cm$^2$) or less, more preferably 150 ((g/min)/cm$^2$) or less, most preferably 75 ((g/min)/cm$^2$) or less.

Further, when the magnetic force and direction (N-S) change with a position in the longitudinal direction in a bar magnet, the maximum absolute value of the magnetic force is usually shown.

An example of a preferred magnetic separator includes a magnetic separator having a structure in which bar magnets each having a predetermined magnetic force are arranged side by side with a space between them, and the arranged bar magnets are vertically stacked in a plurality of stages. In such an apparatus, when the magnets are vertically stacked in a plurality of stages, the magnets may also be arranged so that the magnet direction is alternately changed vertically.

Further, another example of a preferred magnetic separator includes a magnetic separator having a structure in which bar magnets, particularly round bar magnets, each having a predetermined magnetic force are arranged on a circumference with a space between them to form a cylinder-shaped arrangement; the cylinder is rotated about a horizontal axis; and a hydrogen storing alloy is dropped from above the cylinder. The number of revolution of the magnet (cylinder body) in this case is preferably adjusted to 100 revolutions/min or less, more preferably 60 revolutions/min or less, most preferably 40 revolutions/min or less, because if the rotation is increased, the magnetic substance that is magnetically attracted will be peeled off by centrifugal force.

With respect to a magnetic separation apparatus, the ratio of the volume of a magnetic separation tank (:the volume of the space where a hydrogen storing alloy is charged and subjected to magnetic separation) relative to the charge rate is preferably 0.5 to 100 (cm$^3$/(g/min)). This is because a magnetic substance can be effectively removed when the magnetic separation apparatus is specified in this range.

From such a point of view, the ratio of the volume of the magnetic separation tank relative to the charge rate is more preferably 0.5 to 90 (cm$^3$/(g/min)), most preferably 0.5 to 80 (cm$^3$/(g/min)).

The hydrogen storing alloy powder obtained by magnetic separation is preferably further finely ground depending on applications.

The fine grinding can be performed using a cracking apparatus or a grinding apparatus in which a grinding portion in contact with a powder, that is, a grinding means, is made of iron or an iron alloy. Examples of such a cracking apparatus or a grinding apparatus include a pin mill and a hammer mill.

Note that when the alloy powder is finely ground in an apparatus provided with a grinding means containing iron or an iron alloy, the iron or iron alloy will be mixed with the coarsely ground powder, but the present inventor has verified that the amount of a magnetic substance leading to a short circuit hardly increases in the fine grinding.

A hydrogen storing alloy can be used as a negative electrode active material for various batteries by suitably surface-treating the surface of the hydrogen storing alloy as needed, such as covering the surface with a metallic material, a polymer resin, or the like or treating the surface with an acid or an alkali.

(Battery)

A hydrogen storing alloy negative electrode obtained in this way, that is, a hydrogen storing alloy negative electrode obtained by mixing a binder, a conductive aid, and the like with the present hydrogen storing alloy and shaping the mixture, by a known method, can be utilized for primary batteries (including a fuel cell) in addition to secondary batteries. For example, a Ni-MH battery can be formed from a positive electrode using nickel hydroxide as an active material, an electrolyte solution made of an alkali aqueous solution, and a separator.

Particularly, the present hydrogen storing alloy is excellent in corrosion resistance and can increase charge-discharge cycle ability without reducing the output, and thus, the alloy can be particularly suitably used as a Ni-MH battery to be mounted on EV, HEV, and the like requiring these characteristics.

<Description of Words and Phrases>

When expressed as "X to Y" (X and Y are arbitrary numbers) in the present description, this expression includes not only the meaning of "X or more and Y or less" but also the meaning of "preferably larger than X" or "preferably smaller than Y", unless otherwise specified.

Further, when expressed as "X or more" or "X≤" (X is an arbitrary number) or "Y or less" or "≤Y" (Y is an arbitrary number), the expression includes the meaning of "preferably larger than X" or "preferably less than Y", respectively.

EXAMPLES

Next, the present invention will be further described based on Examples. However, the present invention is not limited to Examples to be described below.

Example 1

Raw materials (pure metals were used as the raw materials of Ni, Mn, Al, and Co) were weighed and mixed so that the mixture included 32.03% Mm, 59.30% Ni, 5.67% Mn, 2.29% Al, and 0.68% Co, in terms of the mass percentage of each element.

Note that Mm is a misch metal which is a rare earth mixture including La and Ce, and an Mm material adjusted so that the contents of the components in Mm were 62.4% La, 26.8% Ce, 8.2% Nd, and 2.6% Pr based on the total mass of Mm was used as the raw material.

The resulting mixture was put into a crucible, and the crucible was fixed in a high frequency melting furnace. The furnace was evacuated to $10^{-4}$ to $10^{-5}$ Torr; argon gas was then introduced into the furnace; and the mixture was heated to 1450° C. in an argon gas atmosphere to obtain a molten metal. Next, 10 kg of the molten metal was poured into a water-cooled copper mold having a gross mass of 200 kg at a rate of 4 kg/s to obtain a hydrogen storing alloy. Further, the resulting hydrogen storing alloy was put into a stainless steel container; the container was set in a vacuum heat treatment apparatus; and the alloy was heat-treated in an argon gas atmosphere to obtain a hydrogen storing alloy (ingot).

In the above heat treatment, the alloy was heated to 980° C. at a heating rate of 10° C./min in an argon gas atmosphere, subjected to high-temperature holding treatment so that a temperature of 980° C. was maintained for 3 hours, cooled to 500° C. at a cooling rate of 20° C./min, and then naturally cooled to 100° C. or less. Subsequently, the alloy was again heated to 980° C. at a heating rate of 10° C./min in an argon gas atmosphere, subjected to high-temperature holding treatment so that a temperature of 980° C. was maintained for 3 hours, cooled to 500° C. at a cooling rate of 20° C./min, and then naturally cooled to room temperature.

Next, the above hydrogen storing alloy (ingot) was coarsely ground to a particle size that passes through a 500 μm mesh sieve (−500 μm) using a jaw crusher (model 1021-B) manufactured by Fuji Paudl Co., Ltd. and a Brown mill (model 1025-HBG) manufactured by Yoshida Seisakusho Co., Ltd.

The resulting hydrogen storing alloy (sample) was identified to be $MmNi_{4.41}Al_{0.37}Mn_{0.45}Co_{0.05}$ (ABx=5.28) by ICP analysis.

Example 2

The hydrogen storing alloy ingot prepared in Example 1 was used, and the holding temperature in both the first and the second high-temperature holding treatment in Example 1 was changed to 950° C. The ingot was heat-treated in the same manner as in Example 1 except the above to obtain a hydrogen storing alloy powder (sample).

Example 3

The hydrogen storing alloy ingot prepared in Example 1 was used, and the holding temperature in both the first and the second high-temperature holding treatment in Example 1 was changed to 920° C. The ingot was heat-treated in the same manner as in Example 1 except the above to obtain a hydrogen storing alloy powder (sample).

Example 4

The hydrogen storing alloy ingot prepared in Example 1 was used, and the holding temperature in both the first and the second high-temperature holding treatment in Example 1 was changed to 1020° C. The ingot was heat-treated in the same manner as in Example 1 except the above to obtain a hydrogen storing alloy powder (sample).

Example 5

The hydrogen storing alloy ingot prepared in Example 1 was used, and the holding temperature in both the first and the second high-temperature holding treatment in Example 1 was changed to 1040° C. The ingot was heat-treated in the same manner as in Example 1 except the above to obtain a hydrogen storing alloy powder (sample).

Example 6

Raw materials (pure metals were used as the raw materials of Ni, Mn, Al, and Co) were weighed and mixed so that the mixture included 31.93% Mm, 58.49% Ni, 4.41% Mn, 2.47% Al, and 2.70% Co, in terms of the mass percentage of each element.

Note that Mm is a misch metal which is a rare earth mixture including La and Ce, and an Mm material adjusted so that the contents of the components in Mm were 78.3% La, 15.5% Ce, 4.7% Nd, and 1.5% Pr based on the total mass of Mm was used as the raw material.

The resulting mixture was put into a crucible, and the crucible was fixed in a high frequency melting furnace. The furnace was evacuated to $10^{-4}$ to $10^{-5}$ Torr; argon gas was then introduced into the furnace; and the mixture was heated to 1450° C. in an argon gas atmosphere to obtain a molten metal. Next, 10 kg of the molten metal was poured into a water-cooled copper mold having a gross mass of 200 kg at a rate of 4 kg/s to obtain a hydrogen storing alloy. Further, the resulting hydrogen storing alloy was put into a stainless steel container; the container was set in a vacuum heat treatment apparatus; and the alloy was heat-treated in an argon gas atmosphere to obtain a hydrogen storing alloy (ingot).

In the above heat treatment, the alloy was heated to 1030° C. at a heating rate of 10° C./min in an argon gas atmosphere, subjected to high-temperature holding treatment so that a temperature of 1030° C. was maintained for 3 hours, cooled to 500° C. at a cooling rate of 20° C./min, and then naturally cooled to 100° C. or less. Subsequently, the alloy was again heated to 1030° C. at a heating rate of 10° C./min in an argon gas atmosphere, subjected to high-temperature holding treatment so that a temperature of 1030° C. was maintained for 3 hours, cooled to 500° C. at a cooling rate of 20° C./min, and then naturally cooled to room temperature.

Next, the above hydrogen storing alloy (ingot) was coarsely ground to a particle size that passes through a 500 μm mesh sieve (−500 μm) using a jaw crusher (model 1021-B) manufactured by Fuji Paudl Co., Ltd. and a Brown mill (model 1025-HBG) manufactured by Yoshida Seisakusho Co., Ltd.

The resulting hydrogen storing alloy (sample) was identified to be $MmNi_{4.35}Al_{0.40}Mn_{0.35}Co_{0.20}$ (ABx=5.30) by ICP analysis.

Example 7

The hydrogen storing alloy ingot prepared in Example 6 was used, and the holding temperature in both the first and the second high-temperature holding treatment in Example 6 was changed to 1045° C. The ingot was heat-treated in the same manner as in Example 6 except the above to obtain a hydrogen storing alloy powder (sample).

Example 8

The hydrogen storing alloy ingot prepared in Example 6 was used, and the holding temperature in both the first and the second high-temperature holding treatment in Example 6 was changed to 1050° C. The ingot was heat-treated in the same manner as in Example 6 except the above to obtain a hydrogen storing alloy powder (sample).

Example 9

The hydrogen storing alloy ingot prepared in Example 6 was used, and the holding temperature in both the first and the second high-temperature holding treatment in Example 6 was changed to 1055° C. The ingot was heat-treated in the same manner as in Example 6 except the above to obtain a hydrogen storing alloy powder (sample).

Example 10

Raw materials (pure metals were used as the raw materials of Ni, Mn, Al, and Co) were weighed and mixed so that the mixture included 31.71% Mm, 55.43% Ni, 5.00% Mn, 1.96% Al, and 5.90% Co, in terms of the mass percentage of each element.

Note that Mm is a misch metal which is a rare earth mixture including La and Ce, and an Mm material adjusted so that the contents of the components in Mm were 78.8% La, 15.1% Ce, 4.6% Nd, and 1.5% Pr based on the total mass of Mm was used as the raw material.

The resulting mixture was put into a crucible, and the crucible was fixed in a high frequency melting furnace. The furnace was evacuated to $10^{-4}$ to $10^{-5}$ Torr; argon gas was then introduced into the furnace; and the mixture was heated to 1450° C. in an argon gas atmosphere to obtain a molten metal. Next, 10 kg of the molten metal was poured into a water-cooled copper mold having a gross mass of 200 kg at a rate of 4 kg/s to obtain a hydrogen storing alloy. Further, the resulting hydrogen storing alloy was put into a stainless steel container; the container was set in a vacuum heat treatment apparatus; and the alloy was heat-treated in an argon gas atmosphere to obtain a hydrogen storing alloy (ingot).

In the above heat treatment, the alloy was heated to 1035° C. at a heating rate of 10° C./min in an argon gas atmosphere, subjected to high-temperature holding treatment so that a temperature of 1035° C. was maintained for 3 hours, cooled to 500° C. at a cooling rate of 20° C./min, and then naturally cooled to 100° C. or less. Subsequently, the alloy was again heated to 1035° C. at a heating rate of 10° C./min in an argon gas atmosphere, subjected to high-temperature holding treatment so that a temperature of 1035° C. was maintained for 3 hours, cooled to 500° C. at a cooling rate of 20° C./min, and then naturally cooled to room temperature.

Next, the above hydrogen storing alloy (ingot) was coarsely ground to a particle size that passes through a 500 μm mesh sieve (−500 μm) using a jaw crusher (model 1021-B) manufactured by Fuji Paudl Co., Ltd. and a Brown mill (model 1025-HBG) manufactured by Yoshida Seisakusho Co., Ltd.

The resulting hydrogen storing alloy (sample) was identified to be $MmNi_{4.15}Al_{0.32}Mn_{0.40}Co_{0.44}$ (ABx=5.31) by ICP analysis.

Example 11

The hydrogen storing alloy ingot prepared in Example 10 was used, and the holding temperature in both the first and the second high-temperature holding treatment in Example 10 was changed to 1040° C. The ingot was heat-treated in the same manner as in Example 10 except the above to obtain a hydrogen storing alloy powder (sample).

Example 12

The hydrogen storing alloy ingot prepared in Example 10 was used, and the holding temperature in both the first and the second high-temperature holding treatment in Example 10 was changed to 1055° C. The ingot was heat-treated in the same manner as in Example 10 except the above to obtain a hydrogen storing alloy powder (sample).

Example 13

The hydrogen storing alloy ingot prepared in Example 10 was used, and the holding temperature in both the first and the second high-temperature holding treatment in Example 10 was changed to 1020° C. The ingot was heat-treated in the same manner as in Example 10 except the above to obtain a hydrogen storing alloy powder (sample).

Example 14

The hydrogen storing alloy ingot prepared in Example 10 was used, and the holding temperature in both the first and the second high-temperature holding treatment in Example 10 was changed to 1030° C. The ingot was heat-treated in the same manner as in Example 10 except the above to obtain a hydrogen storing alloy powder (sample).

Example 15

The hydrogen storing alloy ingot prepared in Example 10 was used, and the holding temperature in both the first and the second high-temperature holding treatment in Example 10 was changed to 1090° C. The ingot was heat-treated in the same manner as in Example 10 except the above to obtain a hydrogen storing alloy powder (sample).

Example 16

Raw materials (pure metals were used as the raw materials of Ni, Mn, Al, and Co) were weighed and mixed so that the mixture included 32.40% Mm, 55.93% Ni, 3.95% Mn, 2.25% Al, and 5.47% Co, in terms of the mass percentage of each element.

Note that Mm is a misch metal which is a rare earth mixture including La and Ce, and an Mm material adjusted so that the contents of the components in Mm were 61.7% La, 27.3% Ce, 8.4% Nd, and 2.6% Pr based on the total mass of Mm was used as the raw material.

The resulting mixture was put into a crucible, and the crucible was fixed in a high frequency melting furnace. The furnace was evacuated to $10^{-4}$ to $10^{-5}$ Torr; argon gas was then introduced into the furnace; and the mixture was heated to 1450° C. in an argon gas atmosphere to obtain a molten metal. Next, 10 kg of the molten metal was poured into a water-cooled copper mold having a gross mass of 200 kg at a rate of 4 kg/s to obtain a hydrogen storing alloy. Further, the resulting hydrogen storing alloy was put into a stainless steel container; the container was set in a vacuum heat treatment apparatus; and the alloy was heat-treated in an argon gas atmosphere to obtain a hydrogen storing alloy (ingot).

In the above heat treatment, the alloy was heated to 1080° C. at a heating rate of 10° C./min in an argon gas atmosphere, subjected to high-temperature holding treatment so that a temperature of 1080° C. was maintained for 3 hours, cooled to 500° C. at a cooling rate of 20° C./min, and then naturally cooled to 100° C. or less. Subsequently, the alloy was again heated to 1080° C. at a heating rate of 10° C./min in an argon gas atmosphere, subjected to high-temperature holding treatment so that a temperature of 1080° C. was maintained for 3 hours, cooled to 500° C. at a cooling rate of 20° C./min, and then naturally cooled to room temperature.

Next, the above hydrogen storing alloy (ingot) was coarsely ground to a particle size that passes through a 500 μm mesh sieve (−500 μm) using a jaw crusher (model 1021-B) manufactured by Fuji Paudl Co., Ltd. and a Brown mill (model 1025-HBG) manufactured by Yoshida Seisakusho Co., Ltd.

The resulting hydrogen storing alloy (sample) was identified to be $MmNi_{4.11}Al_{0.36}Mn_{0.31}Co_{0.40}$ (ABx=5.18) by ICP analysis.

Example 17

The hydrogen storing alloy ingot prepared in Example 16 was used in Example 16. The heat treatment was changed to pulse heat treatment of repeating, for 3 hours in total, heating and cooling by ±3° C. from a central temperature of 1080° C. at a heating rate and a cooling rate of 0.3° C./min, such that the ingot was first heated to a central temperature of 1080° C. at a heating rate of 10° C./min; the ingot was then heated to a central temperature +3° C. of 1083° C. at a heating rate of 0.3° C./min; immediately after that, the ingot was then cooled to a central temperature −3° C. of 1077° C. at a cooling rate of 0.3° C./min; and immediately after that, the ingot was heated again to 1083° C. at a heating rate of 0.3° C./min. After the ingot was subjected to pulse heat treatment in this way, the resulting ingot was cooled to 500° C. at a cooling rate of 20° C./min and then naturally cooled to room temperature. The ingot was subjected to the above pulse heat treatment and cooling once to obtain a hydrogen storing alloy powder (sample).

Example 18

Raw materials (pure metals were used as the raw materials of Ni, Mn, Al, and Co) were weighed and mixed so that the mixture included 31.89% Mm, 58.53% Ni, 4.41% Mn, 2.47% Al, and 2.70% Co, in terms of the mass percentage of each element.

Note that Mm is a misch metal which is a rare earth mixture including La and Ce, and an Mm material adjusted so that the contents of the components in Mm were 81.6% La and 18.4% Ce based on the total mass of Mm was used as the raw material.

The resulting mixture was put into a crucible, and the crucible was fixed in a high frequency melting furnace. The furnace was evacuated to $10^{-4}$ to $10^{-5}$ Torr; argon gas was then introduced into the furnace; and the mixture was heated to 1450° C. in an argon gas atmosphere to obtain a molten metal. Next, 10 kg of the molten metal was poured into a water-cooled copper mold having a gross mass of 200 kg at a rate of 4 kg/s to obtain a hydrogen storing alloy. Further, the resulting hydrogen storing alloy was put into a stainless steel container; the container was set in a vacuum heat treatment apparatus; and the alloy was heat-treated in an argon gas atmosphere to obtain a hydrogen storing alloy (ingot).

In the above heat treatment, the alloy was heated to 1060° C. at a heating rate of 10° C./min in an argon gas atmosphere, subjected to high-temperature holding treatment so that a temperature of 1060° C. was maintained for 3 hours, cooled to 500° C. at a cooling rate of 20° C./min, and then naturally cooled to 100° C. or less. Subsequently, the alloy was again heated to 1060° C. at a heating rate of 10° C./min in an argon gas atmosphere, subjected to high-temperature holding treatment so that a temperature of 1060° C. was maintained for 3 hours, cooled to 500° C. at a cooling rate of 20° C./min, and then naturally cooled to room temperature.

Next, the above hydrogen storing alloy (ingot) was coarsely ground to a particle size that passes through a 500 μm mesh sieve (−500 μm) using a jaw crusher (model 1021-B) manufactured by Fuji Paudl Co., Ltd. and a Brown mill (model 1025-HBG) manufactured by Yoshida Seisakusho Co., Ltd.

The resulting hydrogen storing alloy (sample) was identified to be $MmNi_{4.35}Al_{0.40}Mn_{0.35}Co_{0.20}$ (ABx=5.30) by ICP analysis.

Example 19

A hydrogen storing alloy (sample) was obtained in the same manner as in Example 18 except that the heat treatment for obtaining a hydrogen storing alloy (ingot) in Example 18 was changed as follows.

That is, the alloy was heated to 1070° C. at a heating rate of 10° C./min in an argon gas atmosphere, subjected to high-temperature holding treatment so that a temperature of 1070° C. was maintained for 3 hours, cooled to 500° C. at a cooling rate of 20° C./min, and then naturally cooled to 100° C. or less. Subsequently, the alloy was again heated to 1070° C. at a heating rate of 10° C./min in an argon gas atmosphere, subjected to high-temperature holding treatment so that a temperature of 1070° C. was maintained for 3 hours, cooled to 500° C. at a cooling rate of 20° C./min, and then naturally cooled to room temperature.

The hydrogen storing alloy (sample) obtained in Example 19 was identified to be $MmNi_{4.35}Al_{0.40}Mn_{0.35}Co_{0.20}$ (ABx=5.30) by ICP analysis.

Example 20

A hydrogen storing alloy (sample) was obtained in the same manner as in Example 18 except that the heat treatment for obtaining a hydrogen storing alloy (ingot) in Example 18 was changed as follows.

That is, the alloy was heated to 1080° C. at a heating rate of 10° C./min in an argon gas atmosphere, subjected to high-temperature holding treatment so that a temperature of 1080° C. was maintained for 3 hours, cooled to 500° C. at a cooling rate of 20° C./min, and then naturally cooled to 100° C. or less. Subsequently, the alloy was again heated to 1080° C. at a heating rate of 10° C./min in an argon gas atmosphere, subjected to high-temperature holding treatment so that a temperature of 1080° C. was maintained for 3 hours, cooled to 500° C. at a cooling rate of 20° C./min, and then naturally cooled to room temperature.

The hydrogen storing alloy (sample) obtained in Example 20 was identified to be $MmNi_{4.35}Al_{0.40}Mn_{0.35}Co_{0.20}$ (ABx=5.30) by ICP analysis.

Comparative Example 1

A hydrogen storing alloy powder (sample) was obtained in the same manner as in Example 16 using the hydrogen storing alloy ingot prepared in Example 16 except that the high-temperature holding treatment followed by cooling in Example 16 was performed only once.

Comparative Example 2

Raw materials (pure metals were used as the raw materials of Ni, Mn, Al, and Co) were weighed and mixed so that the mixture included 33.18% Mm, 49.26% Ni, 5.20% Mn, 1.91% Al, and 10.45% Co, in terms of the mass percentage of each element.

Note that Mm is a misch metal which is a rare earth mixture including La and Ce, and an Mm material adjusted so that the contents of the components in Mm were 33.1% La, 47.7% Ce, 14.6% Nd, and 4.6% Pr based on the total mass of Mm was used as the raw material.

The resulting mixture was put into a crucible, and the crucible was fixed in a high frequency melting furnace. The furnace was evacuated to $10^{-4}$ to $10^{-5}$ Torr; argon gas was then introduced into the furnace; and the mixture was heated to 1450° C. in an argon gas atmosphere to obtain a molten metal. Next, 10 kg of the molten metal was poured into a water-cooled copper mold having a gross mass of 200 kg at a rate of 4 kg/s to obtain a hydrogen storing alloy. Further, the resulting hydrogen storing alloy was put into a stainless steel container; the container was set in a vacuum heat treatment apparatus; and the alloy was heat-treated in an argon gas atmosphere to obtain a hydrogen storing alloy (ingot).

In the above heat treatment, the alloy was heated to 1045° C. at a heating rate of 10° C./min in an argon gas atmosphere, subjected to high-temperature holding treatment so that a temperature of 1045° C. was maintained for 3 hours, cooled to 500° C. at a cooling rate of 20° C./min, and then naturally cooled to 100° C. or less. Subsequently, the alloy was again heated to 1045° C. at a heating rate of 10° C./min in an argon gas atmosphere, subjected to high-temperature holding treatment so that a temperature of 1045° C. was maintained for 3 hours, cooled to 500° C. at a cooling rate of 20° C./min, and then naturally cooled to room temperature.

Next, the above hydrogen storing alloy (ingot) was coarsely ground to a particle size that passes through a 500 µm mesh sieve (−500 µm) using a jaw crusher (model 1021-B) manufactured by Fuji Paudl Co., Ltd. and a Brown mill (model 1025-HBG) manufactured by Yoshida Seisakusho Co., Ltd.

The resulting hydrogen storing alloy (sample) was identified to be $MmNi_{3.55}Al_{0.30}Mn_{0.40}Co_{0.75}$ (ABx=5.00) by ICP analysis.

Comparative Example 3

The hydrogen storing alloy ingot prepared in Comparative Example 2 was used, and the holding temperature in both the first and the second high-temperature holding treatment in Comparative Example 2 was changed to 1055° C. The ingot was heat-treated in the same manner as in Comparative Example 2 except the above to obtain a hydrogen storing alloy powder (sample).

Comparative Example 4

The hydrogen storing alloy ingot prepared in Comparative Example 2 was used, and the holding temperature in both the first and the second high-temperature holding treatment in Comparative Example 2 was changed to 1065° C. The ingot was heat-treated in the same manner as in Comparative Example 2 except the above to obtain a hydrogen storing alloy powder (sample).

Comparative Example 5

The hydrogen storing alloy ingot prepared in Comparative Example 2 was used, and the holding temperature in both the first and the second high-temperature holding treatment in Comparative Example 2 was changed to 1085° C. The ingot was heat-treated in the same manner as in Comparative Example 2 except the above to obtain a hydrogen storing alloy powder (sample).

Comparative Example 6

Raw materials (pure metals were used as the raw materials of Ni, Mn, Al, and Co) were weighed and mixed so that the mixture included 31.80% Mm, 55.35% Ni, 5.10% Mn, 2.15% Al, 4.03% Co, and 1.57% Fe, in terms of the mass percentage of each element.

Note that Mm is a misch metal which is a rare earth mixture including La and Ce, and an Mm material adjusted so that the contents of the components in Mm were 62.9% La, 26.1% Ce, 8.3% Nd, and 2.7% Pr based on the total mass of Mm was used as the raw material.

The resulting mixture was put into a crucible, and the crucible was fixed in a high frequency melting furnace. The furnace was evacuated to $10^{-4}$ to $10^{-5}$ Torr; argon gas was then introduced into the furnace; and the mixture was heated to 1450° C. in an argon gas atmosphere to obtain a molten metal. Next, 10 kg of the molten metal was poured into a water-cooled copper mold having a gross mass of 200 kg at a rate of 4 kg/s to obtain a hydrogen storing alloy. Further, the resulting hydrogen storing alloy was put into a stainless steel container; the container was set in a vacuum heat treatment apparatus; and the alloy was subjected to high-temperature holding treatment after an overshoot in an argon gas atmosphere to obtain a hydrogen storing alloy (sample).

The above overshoot and high-temperature holding treatment were performed as follows: the alloy was heated to 1070° C. at a heating rate of 10° C./min, heated from 1070° C. to 1080° C. in 20 minutes, started to be cooled immediately after reaching 1080° C., and cooled from 1080° C. to 1070° C. in 20 minutes, thus performing overshoot, followed by maintaining 1070° C. for 4 hours and 5 minutes. Subsequently, the alloy was cooled to 500° C. at a cooling rated of 20° C./min and then naturally cooled to room temperature.

Next, the above hydrogen storing alloy (ingot) was coarsely ground to a particle size that passes through a 500 µm mesh sieve (−500 µm) using a jaw crusher (model 1021-B) manufactured by Fuji Paudl Co., Ltd. and a Brown mill (model 1025-HBG) manufactured by Yoshida Seisakusho Co., Ltd.

The resulting hydrogen storing alloy (sample) was identified to be $MmNi_{4.15}Al_{0.35}Mn_{0.41}Co_{0.30}Fe_{0.12}$ (ABx=5.33) by ICP analysis.

<Evaluation Method>

The hydrogen storing alloy powders (samples) obtained in Examples and Comparative Examples were subjected to various evaluations as follows.

<Measurement of Residual Magnetization>
(Preparation of Sample)

The hydrogen storing alloy powders (passed through a 500 μm sieve) obtained in Examples and Comparative Examples in an amount of 20 g were ground for 1 minute in a cyclo mill ((model 1033-200) manufactured by Yoshida Seisakusho Co., Ltd.) and classified using a sieve having an opening of 20 μm to obtain a hydrogen storing alloy powder (sample) of −20 μm (particles that passes through a 20 μm mesh sieve).

The resulting sample was measured for a hysteresis loop using a VSM (Vibrating Sample Magnetometer: "TM-VSM1014-MRO-M type" manufactured by Tamakawa Co., Ltd., electromagnet: TM-WTF51.406-101.5FA type, sample holder: TM-VSMSH-21-3 type, sample container: TM-VSMPCA-C type).
(Measurement Conditions of Vibrating Sample Magnetometer)
  max magnetic field: 10 (kOe)
  time constant lock-in amp: 100 (msec)
  measuring method: sweep {speed 1: 5 sec/1 kOe, speed 2: 10 sec/1 kOe} (1 to −1 [kOe])
  angle: fix 0 [°]
  gap of pole chips: 14 mm
  measuring loop: half The residual magnetization is a value of magnetization at 0 (kOe), when +10 (kOe) is applied, and a sweep was then performed under the above conditions until −10 (kOe) is applied. From the resulting hysteresis loop, the Mr value (emu) in the display screen of Analysis (measurement results) in the VSM measurement program was divided by the weight (g) of the measurement sample to obtain the residual magnetization (emu/g).

The basic analysis conditions at this time are as follows.
  Ms or Mmax: Mmax
  Unit of the Y-axis: Magnetic flux density <Measurement of Magnetic Separation Yield>

The hydrogen storing alloy powders (samples) obtained in Examples and Comparative Examples were each charged into a magnetic separator so that the charge rate of the sample relative to the total surface area of a magnet was 0.25 ((g/min)/cm$^2$); and a magnetic substance remaining in the magnet was recovered, and the weight thereof was measured to obtain the amount of the magnetic substance.

Note that, as the magnetic separator, there was used a magnetic separator having a structure in which bar magnets each having a round cross section and a magnetic force of 300 mT (±30 mT) were arranged side by side, and the arranged bar magnets were vertically stacked in four stages (the total surface area of the magnet being 400 cm$^2$).

The magnetic separation yield was calculated from the measured amount of the magnetic substance and the charged amount using the following formula.

Magnetic separation yield (%)=(the charged amount−the amount of magnetic substance)/the charged amount×100

<Measurement of Pulverization Residual Ratio>

The hydrogen storing alloy powders obtained in the above Examples and Comparative Examples were each sieved out to adjust the particle size to a range of 20 μm to 53 μm, thus obtaining a measurement sample. The resulting measurement sample in an amount of 2 g was charged into a PCT holder, which was then connected to a PCT characteristics measuring apparatus (SUZUKI SHOKAN CO., LTD.). Further, the remaining samples were used as the samples before 20 cycles.

The following operations were performed before turning the cycle.
(1) Cleaning treatment of alloy surface: a series of operations were performed twice in which the PCT holder was heated in a mantle heater (250° C.), and 1.75 MPa of hydrogen was introduced into the heated PCT holder and allowed to stand for 10 minutes, followed by vacuum suction.
(2) Alloy activation treatment: the PCT holder was removed from the mantle heater, and 3 MPa of hydrogen was introduced into the PCT holder and held for 10 minutes. Subsequently, the PCT holder was heated in the mantle heater (250° C.), followed by vacuum suction for 10 minutes. The above series of operations were performed twice.

The PCT holder was removed from the mantle heater, moved to a constant temperature bath at 45° C., subjected to vacuum suction for 30 minutes, and then subjected to hydrogen storage and release cycle under the following condition settings.
(Introduced pressure) 2.9 MPa
(Storage time) 300 sec
(Release time) 420 sec
(Number of cycles) 20 cycles After completion of 20 cycles, the PCT holder was subjected to vacuum suction for 30 minutes, and then the sample was removed from the PCT holder to obtain a sample after 20 cycles.

The average particle size (D50) of the powder before and after 20 cycles was measured under the following condition settings using Microtrac (HRA9320-X100, Nikkiso Co., Ltd.), and the pulverization residual ratio (%) was determined by the following formula.

Pulverization residual ratio (%)=(D50 after the cycle/D50 before the cycle)×100    (Formula)

(Transp): Reflec
(Sphere): No
(Ref Inx): 1.51
(Flow): 60 ml/sec
(Power): 25 watts
(Time): 10 sec

TABLE 1

|  | The amount of Co (molar ratio) | B/A (—) | Annealing temperature (° C.) | The number of times of annealing (time) | Residual magnetization (emu/g) | Magnetic separation yield (%) | Pulverization residual ratio (%) |
|---|---|---|---|---|---|---|---|
| Example 1 | 0.05 | 5.28 | 980 | 2 | 0.0031 | 99.99 | — |
| Example 2 | 0.05 | 5.28 | 950 | 2 | 0.0032 | 99.99 | — |
| Example 3 | 0.05 | 5.28 | 920 | 2 | 0.0036 | 99.99 | — |
| Example 4 | 0.05 | 5.28 | 1020 | 2 | 0.0026 | 99.99 | — |

TABLE 1-continued

|  | The amount of Co (molar ratio) | B/A (—) | Annealing temperature (° C.) | The number of times of annealing (time) | Residual magnetization (emu/g) | Magnetic separation yield (%) | Pulverization residual ratio (%) |
|---|---|---|---|---|---|---|---|
| Example 5 | 0.05 | 5.28 | 1040 | 2 | 0.0030 | 99.99 | — |
| Example 6 | 0.20 | 5.30 | 1030 | 2 | 0.0136 | 99.96 | — |
| Example 7 | 0.20 | 5.30 | 1045 | 2 | 0.0110 | 99.98 | — |
| Example 8 | 0.20 | 5.30 | 1050 | 2 | 0.0111 | 99.97 | — |
| Example 9 | 0.20 | 5.30 | 1055 | 2 | 0.0114 | 99.97 | — |
| Example 10 | 0.44 | 5.31 | 1035 | 2 | 0.0162 | 99.97 | — |
| Example 11 | 0.44 | 5.31 | 1040 | 2 | 0.0171 | 99.96 | — |
| Example 12 | 0.44 | 5.31 | 1055 | 2 | 0.0159 | 99.96 | — |
| Example 13 | 0.44 | 5.31 | 1020 | 2 | 0.0186 | 99.94 | — |
| Example 14 | 0.44 | 5.31 | 1030 | 2 | 0.0173 | 99.94 | — |
| Example 15 | 0.44 | 5.31 | 1090 | 2 | 0.0190 | 99.93 | — |
| Example 16 | 0.40 | 5.18 | 1080 | 2 | 0.0129 | 99.96 | 92 |
| Example 17 | 0.40 | 5.18 | 1080 | 1 | 0.0067 | 99.99 | 92 |
| Example 18 | 0.20 | 5.30 | 1060 | 2 | 0.0073 | 99.97 | — |
| Example 19 | 0.20 | 5.30 | 1070 | 2 | 0.0077 | 99.98 | — |
| Example 20 | 0.20 | 5.30 | 1080 | 2 | 0.0071 | 99.98 | — |
| Comparative Example 1 | 0.40 | 5.18 | 1080 | 1 | 0.0251 | 99.92 | 87 |
| Comparative Example 2 | 0.75 | 5.00 | 1045 | 2 | 0.0362 | 99.79 | — |
| Comparative Example 3 | 0.75 | 5.00 | 1055 | 2 | 0.0352 | 99.77 | — |
| Comparative Example 4 | 0.75 | 5.00 | 1065 | 2 | 0.0324 | 99.81 | — |
| Comparative Example 5 | 0.75 | 5.00 | 1085 | 2 | 0.0335 | 99.81 | — |
| Comparative Example 6 | 0.30 | 5.33 | 1070 | 1 | 0.0204 | 99.91 | — |

From the above Examples, the results of tests that have been performed by the present inventor, and the like, it has been found that, in the composition in which ABx and Co content are in a predetermined range, a satisfactory yield can be obtained in magnetic separation treatment by controlling residual magnetization to a value of more than 0 (emu/g) and 0.020 (emu/g) or less. Further, it has also been found that, even if the alloy is not subjected to magnetic separation treatment, the pulverization residual ratio can be satisfactorily increased since residual magnetization is low.

Note that iron or an iron alloy will be mixed as impurities from a grinding machine by coarse grinding in Examples, but when a magnetic substance obtained by performing magnetic separation was investigated, the amount of impurities in the magnetic substance was less than 0.1%, and the balance was the hydrogen storing alloy. If the yield in magnetic separation treatment is reduced, the hydrogen storing alloy separated as a magnetic substance will increase, which will cause clogging in the magnetic separation device and probably prevent magnetic separation treatment itself.

The invention claimed is:

1. A hydrogen storing alloy comprising an AB5-type crystal structure, having a general formula: $MmNi_aMn_bAl_cCo_d$, where "Mm" represents a misch metal, "a" is more than 3.8 and less than 4.7, "b" is more than 0.1 and less than 0.6, "c" is more than 0.1 and less than 0.6, and "d" is more than 0.0 and less than 0.7, wherein the ratio, referred to as "ABx", of the total number of moles of elements comprising the B-site to the total number of moles of elements comprising the A-site is 5.00<ABx≤5.40; the ratio of the number of moles of Co to the total number of moles of elements comprising the A-site is more than 0.0 and less than 0.7; and residual magnetization is more than 0 emu/g and 0.010 emu/g or less.

2. A negative electrode active material of a nickel-hydrogen battery comprising the hydrogen storing alloy according to claim 1.

3. A nickel-hydrogen battery using the negative electrode active material according to claim 2.

4. A nickel-hydrogen battery to be mounted on an electric vehicle or a hybrid electric vehicle, the battery using the negative electrode active material according to claim 2.

5. The hydrogen storing alloy of claim 1, further comprising a matrix phase having a $CaCu_5$-type structure.

6. A hydrogen storing alloy comprising an AB5-type crystal structure, having a general formula: $MmNi_aMn_bAl_cCo_dM_e$, wherein element "Mm" represents a misch metal, "M" represents at least one selected from the group consisting of Fe, Cu, V, Zn and Zr, "a" is more than 3.8 and less than 4.7, "b" is more than 0.1 and less than 0.6, "c" is more than 0.1 and less than 0.6, "d" is more than 0.0 and less than 0.7, and "e" is more than 0 and less than 0.20, wherein a ratio, ABx, of the total number of moles of elements comprising the B-site to the total number of moles of elements comprising the A-site is 5.00<ABx≤5.40; the ratio of the number of moles of Co to the total number of moles of elements comprising the A-site is more than 0.0 and less than 0.7; and residual magnetization is more than 0 emu/g and 0.010 emu/g or less.

7. A negative electrode active material of a nickel-hydrogen battery comprising the hydrogen storing alloy according to claim 6.

8. A nickel-hydrogen battery using the negative electrode active material according to claim 7.

9. A nickel-hydrogen battery to be mounted on an electric vehicle or a hybrid electric vehicle, the battery using the negative electrode active material according to claim 7.

10. The hydrogen storing alloy of claim 6, further comprising a matrix phase having a $CaCu_5$-type structure.

* * * * *